Figures 1, 2:
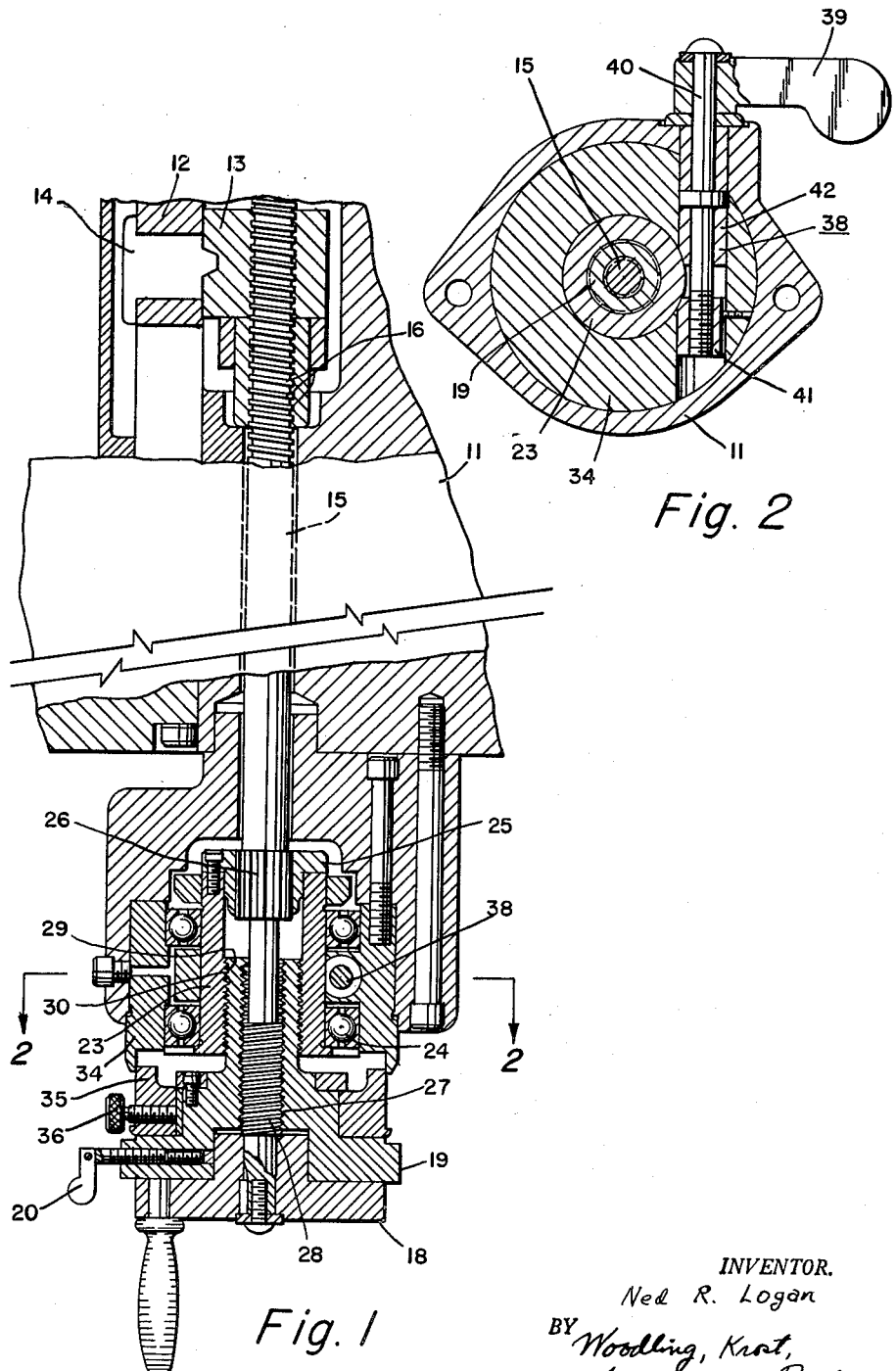

Sept. 17, 1963

N. R. LOGAN 3,103,827

DUAL OPERATOR FOR SLIDES

Filed Nov. 1, 1960

INVENTOR.
Ned R. Logan

BY Woodling, Krost,
Granger and Rust
ATTORNEYS

United States Patent Office 3,103,827
Patented Sept. 17, 1963

3,103,827
DUAL OPERATOR FOR SLIDES
Ned R. Logan, Sidney, Ohio, assignor to The Monarch Machine Tool Company, a corporation of Ohio
Filed Nov. 1, 1960, Ser. No. 66,641
11 Claims. (Cl. 74—424.8)

The invention relates in general to dual operators for a movable part and more particularly, to a slide which may be moved at two different rates by two different operating mechanisms.

Machine tool slides have, in the past, been capable of being moved by a screw mechanism but generally only a single screw mechanism is available to move any given slide. The prior art has known dual operators for slides but these, in most instances, have been cumbersome or inexact means for a dual movement of a slide. Accordingly, an object of the present invention is to provide dual means to move a slide which are both positive, exact, and easy to use.

Another object of the invention is to utilize a differential screw mechanism to move a slide.

Another object of the invention is to provide two different hand wheels, each connected to operate a slide, and both using a single indicia.

Another object of the invention is to provide a dual slide operator wherein separate clamp means may be operated to select either one or the other of the slide operators.

Another object of the invention is to provide a dual slide operator wherein all manipulations are effected at the front of the operating mechanism for easy access.

Another object of the invention is to utilize a single dial with a dual slide operator with the same dial indicating either in thousandths of an inch or in ten thousandths of an inch depending on which operator is used.

Other objects and a fuller understanding of this invention may be had by referring to the following description and claims, taken in conjunction with the accompanying drawing, in which:

FIGURE 1 is a longitudinal sectional view of the dual slide operator of the invention; and FIGURE 2 is a sectional view on line 2—2 of FIGURE 1.

FIGURES 1 and 2 show a portion of a machine tool having a frame 11 which journals a slide 12 for reciprocation. A nut 13 is fixed by a pin 14 to the slide 12. A screw 15 has left hand threads 16 engaging the nut 13. A first hand wheel 18 is fixed to the front end of the screw 15. Accordingly, this first hand wheel may be rotated to rotate the screw 15 and longitudinally move the nut 13 and the slide 12 in a first or coarse adjustment.

A second hand wheel 19 is coaxially disposed to the rear of the first hand wheel 18 and a first binder clamp 20 may be actuated to clamp together the first and second hand wheels 18 and 19.

A sleeve 23 is journaled in the frame 11 on combined radial and thrust bearings 24. Thus, this sleeve 23 may rotate but not move longitudinally relative to the frame 11. A bushing 25 is fixed to the sleeve 23 and has an internal splined connection with a mid portion of the screw 15. First female threads 27 are provided on the second hand wheel 19 and mesh with first threads 28 on the front end of the screw 15. Second male threads 29 are provided on the second hand wheel 19 and mesh with second threads 30 internally on the sleeve 23. The first and second threads 28 and 30 are of different pitch and in the embodiment shown, these threads are of the same hand, namely right hand to be opposite to the hand of the screw threads 16. In the present embodiment, the first threads 28 are of finer pitch than the second threads 30. For example, the first threads may be 20 pitch and the second threads may be 16 pitch. This difference in pitch gives a differential action between the sleeve 23 and the screw 15 as the second hand wheel 19 is rotated and the screw 15 held rotatively stationary. An indicia sleeve 34 is fixed to the frame 11 and cooperates with an indicator dial 35. This indicator dial 35 is coaxial with the second hand wheel 19 and may be adjustably attached thereto by a thumb screw 36. The indica sleeve 34 may carry an index mark and the indicator dial 35 may be marked in graduations indicating one thousandth of an inch per indica mark. For example, the screw threads 16 may be 8 pitch and there may be 125 graduations in a 360 degree circle around the indicator dial 35 to provide this one-thousandth of an inch movement of the slide 12 per graduation on the dial 35.

A second binder clamp 38 acts between the frame 11 and the sleeve 23. As better shown in FIGURE 2, this binder clamp 38 includes a handle 39 to partially rotate a shaft 40 having a screw connection with a cylindrical clamp member 41 which, together with a like cylindrical member 42, clamp upon the sleeve 23.

Operation

The slide 12 may be moved longitudinally in a conventional manner by rotating the first hand wheel 18. To provide the first mode of operation for a coarse adjustment, the second binder clamp 38 is loosened and the first binder clamp 20 tightened. Accordingly, both hand wheeels 18 and 19 rotate together to rotate the screw 15 directly, and the sleeve 23 also rotates in the bearings 24. This rotation of the screw acts through the threads 16 and the nut 13 to move the slide 12 one-thousandth of an inch per indicia mark on the dial 35.

The dual slide operator of the invention also permits fine adjustment of movement of the slide 12 to be made. For this second mode of operation, the binder clamp 38 may be tightened and the first binder clamp 20 loosened. The tightening of the binder clamp 38 establishes that the sleeve 23 may not rotate. This also establishes that the screw 15 may not rotate because the bushing 25 is stationary and thas a splined connection with the screw 15. Accordingly, upon rotation of the second hand wheel 19, the differential action between the first and second threads 28 and 30 establishes a longitudinal non-rotative movement to the screw 15, the nut 13 and the slide 12. With thread pitches of 20 and 16 for the first and second threads 28 and 30, this provides 1/80th of an inch per revolution of the second hand wheel 19. This is exactly one-tenth the rate of movement as in the first mode of operation and accordingly, the dial 35 will exactly indicate .0001 of an inch of movement of the slide 12 per indicia mark on dial 35.

It will be noted that whether the binder clamp 20 is loosened or tightened, one may grasp the second hand wheel 19 to establish either mode of operation by loosening or tightening the second binder clamp 38. Also, the hand wheels are manual means to establish alternatively rotation of the screw 15 or rotation of the differential screw threads 28 and 30 to establish longitudinal movement of the nut 13 in either coarse or fine adjustments.

Also, it will be noted that all manipulations to change from coarse to fine may be effected at the front of the slide operating mechanism without need for changing anything in the rear such as at the nut 13. The binder clamp 38 is a means to hold non-rotative the sleeve 23 to permit rotation of the second hand wheel 19 to move the slide 12 in a fine adjustment in accordance with the differential action of the threads 28 and 30.

Although this invention has been described in its preferred form with a certain degree of particularity, it is understood that the present disclosure of the preferred form has been made only by way of example, and that numerous changes in the details of construction and the combination and arrangement of parts may be resorted to without departing from the spirit and scope of the invention as hereinafter claimed.

What is claimed is:

1. A dual operator for a slide, comprising in combination, a frame, a slide movable on said frame, a rotatable feed screw journaled in said frame, first threaded means between said screw and said slide to reciprocate said slide at a first adjustment rate upon rotation of said screw, means to hold said screw non-rotative, and differential thread means acting on said screw to move said slide in a second adjustment at a different rate.

2. A dual operator for a slide, comprising in combination, a frame, a slide movable on said frame, a rotatable feed screw journaled in said frame, threaded means between said screw and said slide to reciprocate said slide in a coarse adjustment upon rotation of said screw, means to hold non-rotative said screw, and differential thread means acting on said screw to move said slide in a fine adjustment.

3. A dual operator for a slide, comprising in combination, a frame, a slide movable on said frame, a rotatable feed screw journaled in said frame, threaded means between said screw and said slide to reciprocate said slide in a coarse adjustment upon rotation of said screw, a sleeve rotatable in said frame, means establishing a non-rotative and longitudinally movable connection between said sleeve and said screw, handwheel means, means to hold non-rotative said sleeve, and differential thread means operable by said handwheel means and acting on said screw to move said slide in a fine adjustment.

4. A dual operator for a slide, comprising in combination, a frame, a slide movable on said frame, a rotatable feed screw journaled in said frame, first threaded means between said screw and said slide to reciprocate said slide in a coarse adjustment upon rotation of said screw, a sleeve, means establishing a non-rotative and longitudinally movable connection between said sleeve and said screw, a handwheel, means to hold non-rotative said sleeve, and second differential thread means acting on said screw and operable by said handwheel to move said slide in a fine adjustment.

5. A dual operator for a slide, comprising in combination, a frame, a slide movable on said frame, a rotatable feed screw journaled in said frame, a threaded connection between said screw and said slide to reciprocate said slide in a coarse adjustment upon rotation of said screw, a sleeve, means establishing a non-rotative and longitudinally movable connection between said sleeve and said screw, handwheel means, a second threaded connection between said handwheel means and said screw, a third threaded connection between said handwheel means and said sleeve of different pitch from said second threaded connection, binder means to hold said screw non-rotative, means including said binder means to effect longitudinal non-rotative movement of said screw by the differential action of said second and third threaded connections to move said slide in a fine adjustment.

6. A dual operator for a slide, comprising in combination, a frame, a slide movable on said frame, a rotatable feed screw journaled in said frame, a threaded connection between said screw and said slide, a sleeve, means establishing a non-rotative and longitudinally movable connection between said sleeve and said screw, a handwheel, a second threaded connection between said handwheel and said screw, a third threaded connection between said handwheel and said sleeve of different pitch from said second threaded connection, first binder means to hold said screw and said handwheel relatively non-rotative, means including said binder means to move said slide in a coarse adjustment upon rotation of said screw, second binder means to hold said sleeve non-rotative, and means including said second binder means to effect longitudinal non-rotative movement of said screw by the differential action of said second and third threaded connections to move said slide in a fine adjustment.

7. A dual operator for a slide, comprising, in combination, a frame, a slide journaled on said frame for reciprocation, a screw having a threaded connection with said slide, first means to rotate said screw to move said slide in a coarse adjustment, a sleeve journaled in said frame for rotation without axial movement, a non-rotative and axially sliding connection between said sleeve and said screw, handwheel means, first threads on said handwheel means meshing with first threads of one hand on said screw, second threads on said handwheel means meshing with second threads on said sleeve of said one hand, said first and second threads being of different pitch, and clamp means acting between said frame and said sleeve, whereby said clamp means may be tightened to hold rotatively stationary said sleeve and said screw so that the differential action between said first and second threads moves said slide for fine adjustment.

8. A dual operator for a slide, comprising, in combination, a frame, a slide journaled on said frame for reciprocation, a screw having a threaded connection with said slide, a sleeve journaled in said frame for rotation without axial movement, a non-rotative and axially sliding connection between said sleeve and said screw, a first handwheel fixed on the front end of said screw to rotate same, a second handwheel coaxially to the rear of said first handwheel, female threads on said second handwheel meshing with first threads of one hand on said screw, male threads on said second handwheel meshing with second threads on said sleeve of said one hand, said first and second threads being of different pitch relative to each other and both being of opposite hand from said threaded connection to said slide, indicia between said frame and said second handwheel, first clamp means acting between said first and second handwheels, second clamp means acting between said frame and said sleeve, whereby said second clamp means may be loosened and said first clamp means tightened to have said first and second handwheels rotate together to rotate said screw and said sleeve at the same rate and hence longitudinally move said slide for coarse adjustment, and whereby said first clamp means may be loosened and said second clamp means tightened to hold rotatively stationary said sleeve and said screw so that said second handwheel may be rotated independently of said first handwheel with a consequent differential action between said first and second threads to longitudinally move said screw at said axially sliding connection to longitudinally move said slide for fine adjustment.

9. A dual operator for a slide, comprising, in combination, a frame, a slide journaled on said frame for reciprocation, a screw having a left hand threaded connection with said slide, a sleeve journaled in said frame for rotation without axial movement, a splined connection between said sleeve and said screw, a first handwheel fixed on the front end of said screw to rotate same, a second handwheel coaxially to the rear of said first handwheel, female threads on said second handwheel meshing with first right hand threads on said screw, male threads on said second handwheel meshing with second righthand threads on said sleeve, said first and second righthand threads being of different pitch, indicia between said frame and said second handwheel, a first binder clamp acting between said first and second handwheels, a second binder clamp acting between said frame and said sleeve, whereby said second binder clamp may be loosened and said first binder clamp tightened to have said first and second handwheels rotate together to rotate said screw and said sleeve at the same rate and hence longitudinally move said slide one thousandth of an inch per indicia mark, and whereby said first binder clamp may be loosened and said second binder clamp tightened to hold rotatively stationary said sleeve and said screw so that said second handwheel may be rotated independently of said first handwheel with a consequent differential action between said first and second right hand threads to longitudinally move said screw and said slide one ten-thousandth of an inch per indicia mark.

10. A dual operator for a slide, comprising, in combination, a frame, a slide journaled on said frame for reciprocation, a nut fixed to said slide, a screw having left hand threads threaded in said nut, a sleeve journaled in said frame for rotation without axial movement, a splined connection between said sleeve and said screw, a first handwheel fixed on the front end of said screw to rotate same, a second handwheel coaxially to the rear of said first handwheel, female threads on said second handwheel meshing with first right hand threads on said screw, male threads on said second handwheel meshing with second right hand threads on said sleeve, said first and second right hand threads being of different pitch, an indicator dial surrounding said second handwheel, means to fixedly attach said indicator dial to said second handwheel, an index mark fixed relative to said frame and cooperating with said indicator dial, a first binder clamp acting between said first and second handwheels, a second binder clamp acting between said frame and said sleeve, whereby said second binder clamp may be loosened and said first binder clamp tightened to have said first and second handwheels rotate together to rotate said screw and said sleeve at the same rate and hence longitudinally move said slide one thousandth of an inch per indicia on said indicator dial, and whereby said first binder clamp may be loosened and said second binder clamp tightened to hold rotatively stationary said sleeve and said screw so that said second handwheel may be rotated independently of said first handwheel with a consequent differential action between said first and second right hand threads to longitudinally move said screw and said slide in ten-thousandths of an inch per indicia on said indicator dial.

11. A dual operator for a slide, comprising, in combination, a frame, a slide journaled on said frame for reciprocation, a nut fixed to said slide, a screw having left hand threads threaded in said nut, a sleeve journaled in said frame for rotation without axial movement, a bushing fixed to said sleeve, an axially splined connection between said bushing and said screw, a first handwheel fixed on the front end of said screw to rotate same, a second handwheel coaxially to the rear of said first handwheel, female threads on said second handwheel meshing with first right-hand threads on said screw, male threads on said second handwheel meshing with second right-hand threads on said sleeve, said second right-hand threads being of greater pitch than said first right-hand threads, an indicator dial surrounding said second handwheel, a thumbscrew to fixedly attach said indicator dial to said second handwheel, an indicia sleeve fixed to said frame and cooperating with said indicator dial, a first binder clamp acting between said first and second handwheels, a second binder clamp acting between said frame and said sleeve, whereby said second binder clamp may be loosened and said first binder clamp tightened to have said first and second handwheels rotate together to rotate said screw and said sleeve at the same rate and hence longitudinally move said slide one thousandth of an inch per indicia on said indicator dial in accordance with coaction between said nut and said screw, and whereby said first binder clamp may be loosened and said second binder clamp tightened to hold rotatively stationary said sleeve and said screw so that said second handwheel may be rotated independently of said first handwheel with a consequent differential action between said first and second right-hand threads to longitudinally move said screw and said slide one ten-thousandth of an inch per indicia on said indicator dial.

References Cited in the file of this patent
UNITED STATES PATENTS

| | | |
|---|---|---|
| 528,211 | Sedgwick | Oct. 30, 1894 |
| 2,253,535 | Weinig | Aug. 26, 1941 |
| 2,565,628 | Ravilious | Aug. 28, 1951 |
| 2,590,745 | Wuensch | Mar. 25, 1952 |
| 2,829,439 | Cunningham | Apr. 8, 1958 |
| 2,902,885 | Wright | Sept. 8, 1959 |